(12) United States Patent
Bae et al.

(10) Patent No.: US 11,515,598 B2
(45) Date of Patent: Nov. 29, 2022

(54) BATTERY PACK

(71) Applicant: Samsung SDI Co., Ltd., Yongin-si (KR)

(72) Inventors: Sanghoon Bae, Yongin-si (KR); Sangil Yi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 181 days.

(21) Appl. No.: 16/467,023

(22) PCT Filed: Nov. 9, 2017

(86) PCT No.: PCT/KR2017/012639
§ 371 (c)(1),
(2) Date: Jun. 5, 2019

(87) PCT Pub. No.: WO2018/105905
PCT Pub. Date: Jun. 14, 2018

(65) Prior Publication Data
US 2019/0280267 A1    Sep. 12, 2019

(30) Foreign Application Priority Data
Dec. 9, 2016 (KR) .......................... 10-2016-0167803

(51) Int. Cl.
*H01M 50/20*     (2021.01)
*H01M 10/613*    (2014.01)
(Continued)

(52) U.S. Cl.
CPC ......... *H01M 50/20* (2021.01); *H01M 10/613* (2015.04); *H01M 10/625* (2015.04);
(Continued)

(58) Field of Classification Search
CPC ........ H01M 2/1077; H01M 2/10; H01M 2/20; H01M 2/206; H01M 2/26; H01M 2/105;
(Continued)

(56) References Cited

U.S. PATENT DOCUMENTS 10,483,515 B2   11/2019  Yoshida et al.
10,637,110 B1   4/2020   Tsai et al.
(Continued)

FOREIGN PATENT DOCUMENTS

CN    105229820 A    1/2016
CN    105917496 A    8/2016
(Continued)

OTHER PUBLICATIONS

English Translation of CN 106169546.*
(Continued)

*Primary Examiner* — Kiran Quraishi Akhtar
(74) *Attorney, Agent, or Firm* — Lewis Roca Rothgerber Christie LLP

(57) ABSTRACT

Provided is a battery pack including: a plurality of battery cells; a first conductive plate arranged over the plurality of battery cells and electrically connecting the plurality of battery cells; a second conductive plate arranged over the first conductive plate to overlap a portion of the first conductive plate and electrically connecting the plurality of battery cells; and an insulating layer arranged between the first conductive plate and the second conductive plate.

11 Claims, 15 Drawing Sheets

(51) Int. Cl.
  *H01M 10/625* (2014.01)
  *H01M 10/643* (2014.01)
  *H01M 10/6554* (2014.01)
  *H01M 10/6556* (2014.01)
  *H01M 10/653* (2014.01)
  *H01M 50/50* (2021.01)
  *H01M 50/502* (2021.01)
  *H01M 50/531* (2021.01)

(52) U.S. Cl.
  CPC ....... *H01M 10/643* (2015.04); *H01M 10/653* (2015.04); *H01M 10/6554* (2015.04); *H01M 10/6556* (2015.04); *H01M 50/50* (2021.01); *H01M 50/502* (2021.01); *H01M 50/531* (2021.01); *H01M 2220/20* (2013.01)

(58) Field of Classification Search
  CPC .. H01M 2/202; H01M 10/653; H01M 10/613; H01M 10/625; H01M 10/643; H01M 10/6556; H01M 2220/20; H01M 10/6554; H01M 50/20; H01M 50/50; H01M 50/502; H01M 50/531; H01M 50/503; H01M 50/213; Y02E 60/10
  See application file for complete search history.

(56) References Cited

U.S. PATENT DOCUMENTS

| | | | |
|---|---|---|---|
| 2006/0019155 A1* | 1/2006 | Seman, Jr. | H01M 2/204 429/159 |
| 2011/0104549 A1 | 5/2011 | Kim | |
| 2011/0300428 A1 | 12/2011 | Sohn | |
| 2012/0148889 A1* | 6/2012 | Fuhr | H01M 10/625 429/87 |
| 2014/0255748 A1* | 9/2014 | Jan | H01M 10/5004 429/120 |
| 2014/0255750 A1* | 9/2014 | Jan | H01M 2/206 429/120 |
| 2015/0072211 A1 | 3/2015 | Nakamura et al. | |
| 2015/0086823 A1 | 3/2015 | Liew | |
| 2015/0325824 A1* | 11/2015 | Hasegawa | H01M 2/12 429/53 |
| 2016/0181579 A1* | 6/2016 | Geshi | H01M 2/206 429/61 |
| 2016/0336572 A1 | 11/2016 | Yoshida et al. | |
| 2017/0005316 A1* | 1/2017 | Harris | H01M 2/1077 |
| 2021/0249736 A1 | 8/2021 | Jan et al. | |

FOREIGN PATENT DOCUMENTS

| | | | | |
|---|---|---|---|---|
| CN | 106169546 | * | 11/2016 | ......... H01M 10/625 |
| CN | 106169546 A | | 11/2016 | |
| CN | 205680725 U | | 11/2016 | |
| JP | 2013-243079 A | | 12/2013 | |
| JP | 2015-22830 A | | 2/2015 | |
| JP | 2015-53205 A | | 3/2015 | |
| JP | 2016-516273 A | | 6/2016 | |
| KR | 10-1106308 B1 | | 1/2012 | |
| KR | 10-2016-0008823 A | | 1/2016 | |
| WO | WO 2012/053610 A1 | | 4/2012 | |
| WO | 2013/137707 A1 | | 9/2013 | |
| WO | WO 2015/064097 | * | 5/2015 | ............. H01M 2/10 |

OTHER PUBLICATIONS

International Search Report and Written Opinion for corresponding International Application No. PCT/KR2017/012639, dated Mar. 8, 2018, 11pp.
Korean Office Action dated Sep. 15, 2020, issued in corresponding Korean Patent Application No. 10-2016-0167803 (33 pages).
EPO Extended Search Report dated Jul. 1, 2020, for corresponding European Patent Application No. 17879547.2 (9 pages).
Chinese Office action for Application No. 201780082872.9, dated Jul. 13, 2021, 25 pages.

* cited by examiner

BATTERY PACK

CROSS-REFERENCE TO RELATED APPLICATION(S)

This application is a National Phase Patent Application of International Patent Application Number PCT/KR2017/012639, filed on Nov. 9, 2017, which claims priority of Korean Patent Application No. 10-2016-0167803, filed Dec. 9, 2016. The entire contents of both of which are incorporated herein by reference.

TECHNICAL FIELD

The present disclosure relates to a battery pack.

BACKGROUND ART

Unlike a primary battery which is not rechargeable, a secondary battery is a battery that is rechargeable and dischargeable. Recently, a high-power secondary battery that uses a non-aqueous electrolyte of high energy density is under development. A low-capacity battery in which one or several secondary batteries are wrapped in a pack is used for portable miniaturized electronic apparatuses such as mobile phones or notebook computers. A battery pack formed by connecting tens or hundreds of secondary batteries in series or in parallel is used for apparatuses requiring large power such as hybrid automobiles, electric automobiles, or electric bicycles.

Since a battery pack including tens or hundreds of secondary batteries is used for a long time through recharging and discharging, mechanical and electrical connection between the secondary batteries should be stably maintained.

DESCRIPTION OF EMBODIMENTS

Technical Problem

Embodiments provide a battery pack.

Solution to Problem

According to an aspect of the present disclosure, a battery pack includes: a plurality of battery cells; a first conductive plate arranged over the plurality of battery cells and electrically connecting the plurality of battery cells; a second conductive plate arranged over the first conductive plate to overlap a portion of the first conductive plate and electrically connecting the plurality of battery cells; and an insulating layer arranged between the first conductive plate and the second conductive plate.

The plurality of battery cells may be arranged such that a positive pole and a negative pole of each of the plurality of battery cells face the same side.

Each of the first conductive plate and the second conductive plate may include: holes exposing a positive pole and a negative pole of each of the plurality of battery cells; and tabs respectively arranged at the holes, wherein the holes of the first conductive plate and the holes of the second conductive plate may overlap each other.

The insulating layer may include holes overlapping the holes of the first conductive plate and the holes of the second conductive plate.

An inner end of the insulating layer that is adjacent to the holes of the insulating layer may extend toward a center of the holes of the insulating layer beyond an inner end of the second conductive plate.

One of a positive pole and a negative pole of each of the plurality of battery cells may be located at a central portion of one side of each of the plurality of battery cells, and the other may be located at a peripheral portion of the one side.

Tabs of at least one of the first conductive plate and the second conductive plate may include: a positive pole tab connected to a positive pole of a first battery cell among the plurality of battery cells; and a negative pole tab connected to a negative pole of a second battery cell among the plurality of battery cells.

The battery pack may further include: an insulating structure arranged between the plurality of battery cells and the first conductive plate and including holes exposing a positive pole and a negative pole of the plurality of battery cells.

The insulating structure may include a first protrusion corresponding to an outer end of the first conductive plate.

An outer end of the first conductive plate may extend further toward an outside than an outer end of the second conductive plate.

The second conductive plate may further include an auxiliary hole, and the insulating structure may further include a second protrusion inserted into the auxiliary hole of the second conductive plate.

The first conductive plate may further include an auxiliary hole corresponding to the second protrusion, and a size of the auxiliary hole of the first conductive plate may be greater than a size of the auxiliary hole of the second conductive plate.

The battery pack may further include a cooling member arranged on an opposite side of the first and second conductive plates with the plurality of battery cells therebetween.

The cooling member may include a thermal conductive plate.

The cooling member may include a passage through which cooling fluid passes.

According to an aspect of the present disclosure, a battery pack includes: a first battery cell; a second battery cell parallel to the first battery cell; a first conductive plate arranged above the first and second battery cells and including holes and tabs; the holes respectively corresponding to the first and second battery cells and the tabs extending toward the holes; a second conductive plate arranged over the first conductive plate to overlap a portion of the first conductive plate and including holes and tabs, the holes respectively corresponding to the first and second battery cells and the tabs extending toward the holes; and an insulating layer arranged between the first conductive plate and the second conductive plate and including holes respectively corresponding to the first and second battery cells.

The first conductive plate may include a first hole corresponding to the first battery cell and a first tab extending toward the first hole, the second conductive plate may include a second hole corresponding to the first battery cell and a second tab extending toward the second hole, and one of the first tab and the second tab may be connected to a portion of the first battery cell that is exposed through the first hole and the second hole, and the other may be connected to another portion of the first battery cell.

The holes of the first conductive plate, the hole of the second conductive plate, and holes of the insulating layer may have different sizes.

The battery pack may further include an insulating structure including a first protrusion and a second protrusion arranged at different locations, wherein one of the first protrusion and the second protrusion may be adjacent to an outer end of each of the first and second conductive plates, and the other may be arranged to correspond to spaces of the holes of the first and second conductive plates.

These and/or other aspects, characteristics, and advantages will become apparent and more readily appreciated from the accompanying drawings, claims, and the following description of the embodiments.

Advantageous Effects of Disclosure

Battery packs according to an embodiment may electrically connect battery cells without an electrical short circuit through first and second conductive plates (e.g. without contact of the first and second conductive plates) which are arranged over the battery cells and which partially overlap each other. Meanwhile, space utilization may be improved by arranging a cooling structure below the battery cells. The above effects are provided by some embodiments and the scope of the present disclosure is not limited by these effects.

MODE OF DISCLOSURE

Figure 1:
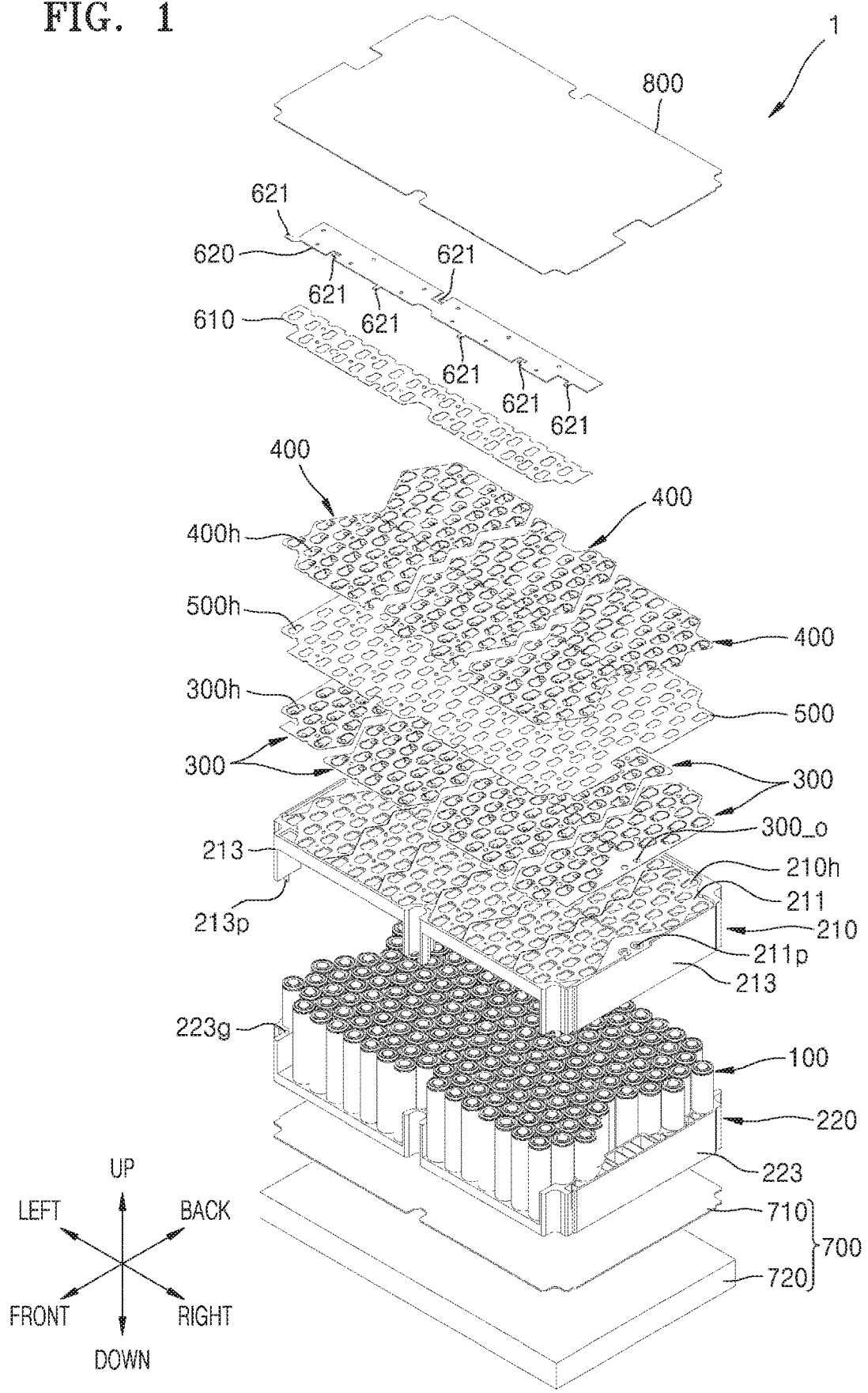
FIG. 1 is a perspective view of a battery pack according to an embodiment.

As the disclosure allows for various changes and numerous embodiments, example embodiments will be illustrated in the drawings and described in detail in the written description. An effect and a characteristic of the disclosure, and a method of accomplishing these will be apparent when referring to embodiments described with reference to the drawings. This disclosure may, however, be embodied in many different forms and should not be construed as limited to the example embodiments set forth herein.

Hereinafter, the disclosure will be described more fully with reference to the accompanying drawings, in which example embodiments of the disclosure are shown. When description is made with reference to the drawings, like reference numerals in the drawings denote like or corresponding elements, and repeated description thereof will be omitted.

It will be understood that although the terms "first", "second", etc. may be used herein to describe various components, these components should not be limited by these terms. These components are only used to distinguish one component from another.

As used herein, the singular forms "a", "an" and "the" are intended to include the plural forms as well, unless the context clearly indicates otherwise.

It will be further understood that the terms "comprises/includes" and/or "comprising/including" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of explanation, the following embodiments are not limited thereto.

When a certain embodiment may be implemented differently, a specific process order may be performed differently from the described order. For example, two consecutively described processes may be performed substantially at the same time or performed in an order opposite to the described order.

It will be understood that when a layer, region, or component is referred to as being "connected" to another layer, region, or component, it may be "directly connected" to the other layer, region, or component or may be "indirectly connected" to the other layer, region, or component with other layer, region, or component interposed therebetween. For example, it will be understood that when a layer, region, or component is referred to as being "connected to or electrically connected" to another layer, region, or component, it may be "directly electrically connected" to the other layer, region, or component or may be "indirectly connected or electrically connected" to other layer, region, or component with other layer, region, or component interposed therebetween.

Figure 2A:
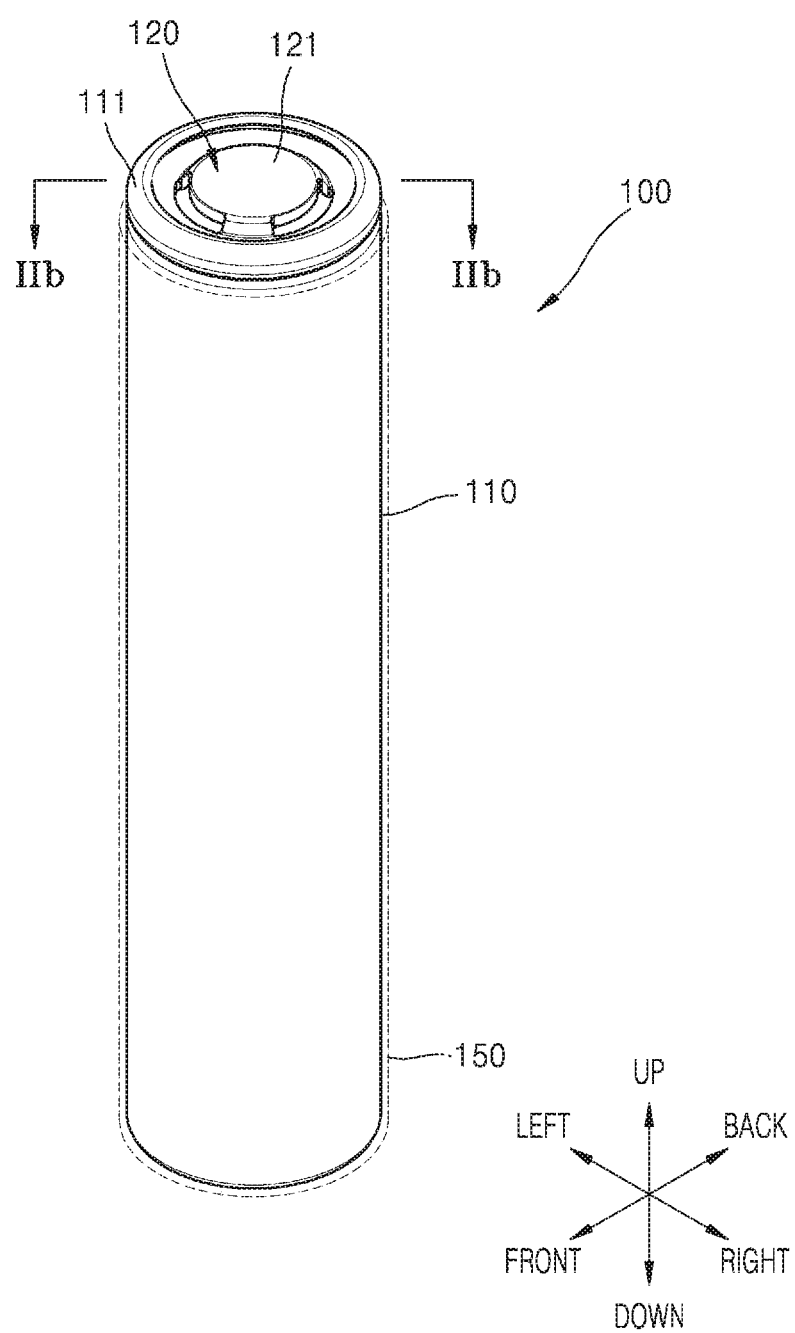
FIG. 2A is a perspective view of one of the battery cells in FIG. 1
Figure 2B:
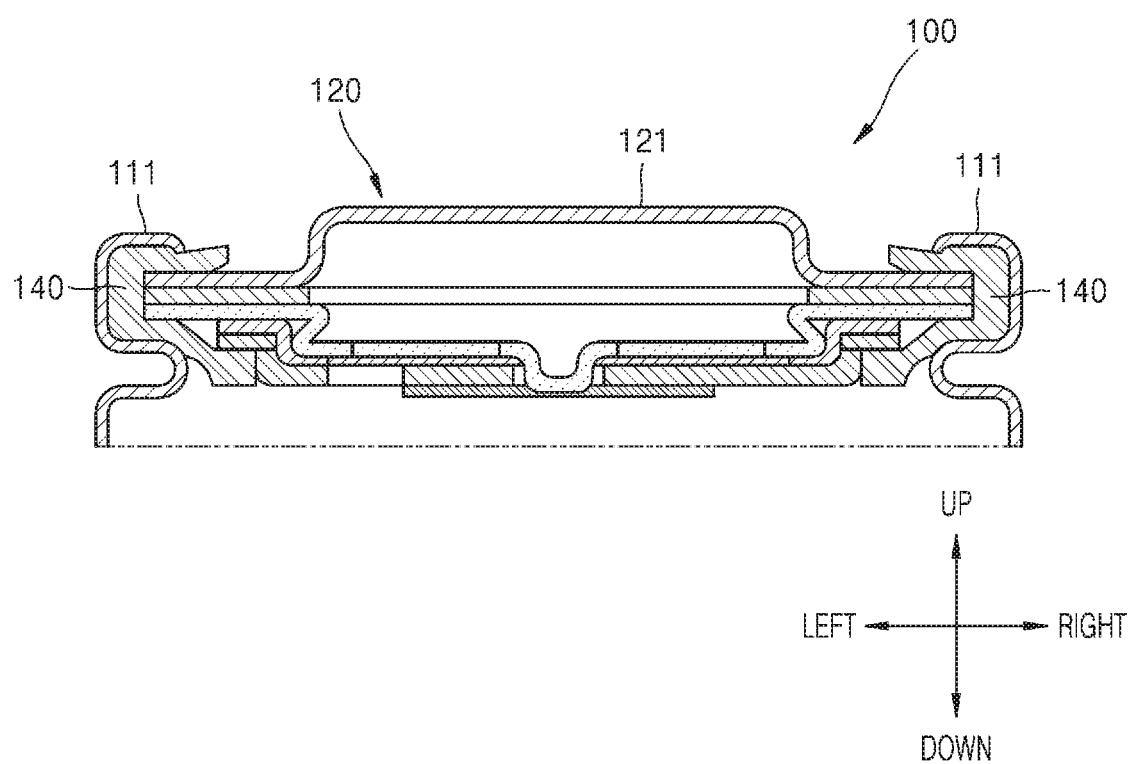
FIG. 2B is a cross-sectional view taken along line IIb-IIb of FIG. 2A.

FIG. 1 is a perspective view of a battery pack according to an embodiment, FIG. 2A is a perspective view of one of the battery cells in FIG. 1, and FIG. 2B is a cross-sectional view taken along line IIb-IIb of FIG. 2A.

Referring to FIG. 1, a battery pack 1 may include battery cells 100, first and second insulating structures 210 and 220 respectively arranged on and under the battery cells 100, first and second conductive plates 300 and 400 over and below the battery cells 100, an insulating layer 500 between the first and second conductive plates 300 and 400, a protective circuit module 620, and a cooling member 700.

Referring to FIGS. 1, 2A, and 2B, the battery cells 100 may include a can 110 configured to receive an electrode assembly, and a cap plate 120 covering an upper portion of the can. Though not shown, the electrode assembly may include a negative pole plate and a positive pole plate, and a separator therebetween, and the electrode assembly may be rolled, for example, in a cylindrical shape and received inside the can 110. In an embodiment, the positive pole plate may include an aluminum foil coated with a positive pole active material of LiCoO$_2$, and the negative pole plate may include a copper foil coated with a negative pole active material such as graphite. The separator may prevent a short circuit between the negative pole plate and the positive pole plate and allow only transfer of lithium ions.

The can 110 may have a cylindrical shape having an open one side (e.g. an upper side). Though the can 110 may include a conductive material, for example, steel, stainless steel, aluminum, or an equivalent thereof, the present disclosure is not limited thereto.

The upper portion 111 of the can 110 may be coupled to the cap plate 120 and sealed by the cap plate 120. A gasket 140 including an insulating material is arranged between the upper portion 111 of the can 110 and the cap plate 120. Though the cap plate 120 may include a conductive material, for example, steel, stainless steel, aluminum, or an equivalent thereof, the present disclosure is not limited thereto.

One of the negative pole plate and the positive pole plate of the electrode assembly is electrically connected to the can 110, and the other is electrically connected to the cap plate 120. Therefore, one of a portion of the can 110, for example, the upper portion 111, and a portion of the cap plate 120, for example, an upper surface 121, may be the negative pole of the battery cell 100, and the other may be the positive pole of the battery cell 100. Hereinafter, for convenience of description, the case where the can 110 and the cap plate 120 are respectively connected to the negative pole plate and the positive pole plate of the electrode assembly is described. Therefore, though the upper portion 111 of the can 110 may be understood as the negative pole, and the upper surface 121 of the cap plate 120 may be understood as the positive pole, the present disclosure is not limited thereto. In another embodiment, the upper portion 111 of the can 110 may be the positive pole, and the upper surface 121 of the cap plate 120 may be the negative pole.

At least a lateral surface of the can 110 may be covered by an insulating sheet 150. The insulating sheet 150 may include a film having an insulating material and cover the lateral surface of the can 110 or cover the lateral surface of the can 110 and an entire or partial surface of a bottom surface (an opposite side of the cap plate 120) of the can 110.

As described above, the battery cell 100 according to embodiments has a structure in which the negative pole 111 and the positive pole 121 are exposed on the same side, that is, an upper side of the battery cell 100. For example, the positive pole 121 may be arranged at a central portion of the upper side of the battery cell 100, and the negative pole 111 may be arranged on a peripheral portion of the upper side of the battery cell 100.

Referring to FIG. 1 again, the battery cells 100 may be arranged such that lateral sides thereof are parallel to each other between the first and second insulating structures 210 and 220. The battery cells 100 are arranged such that both the negative pole 111 and the positive pole 121 of each of the battery cells 100 face upward.

The first and second insulating structures 210 and 220 may be respectively arranged on and under the battery cells 100 and coupled to each other. The first insulating structure 210 may be arranged on the upper side of the battery cells 100 and may include upper insulation plates 211, each including a hole 210h exposing the negative pole 111 and the positive pole 121 arranged on the upper side of each battery cell 100.

A side insulation plate 213 of the first insulating structure 210 may be bent with respect to the upper insulation plate 211 and may include a protrusion 213p extending toward the second insulating structure 220. The protrusion 213p may be inserted into a recess 223g of a side insulation plate 223 of the second insulating structure 220. The first insulating structure 210 may include a protrusion 211p inserted into an opening 300_o of the first conductive plates 300 arranged on two opposite sides among the first conductive plates 300.

The first conductive plates 300 and the second conductive plates 400 are arranged over an upper side of the battery cells 100, for example, on the upper insulation plate 211 of the first insulating structure 210. The first conductive plates 300 may be arranged in left and right directions under the insulating layer 500, for example, between the battery cell 100 and the insulating layer 500. The second conductive plates 400 may be arranged in the left and right directions on the insulating layer 500, for example, between the insulating layer 500 and the protective circuit module 620.

The first conductive plates 300 and the second conductive plates 400 may be offset to partially overlap each other in the left and right directions of FIG. 1. For example, each second conductive plate 400 may be offset in the left and right directions to simultaneously overlap first conductive plates 300 that are adjacent thereto.

The first and second conductive plates 300 and 400 electrically connect the battery cells 100. In other words, the battery cells 100 may be connected to each other by the first and second conductive plates 300 and 400. For this purpose, though the first and second conductive plates 300 and 400 may include a conductive material, for example, aluminum, copper, nickel, titanium, or an alloy thereof, the present disclosure is not limited thereto.

Each of the first and second conductive plates 300 and 400 may respectively include holes 300h and 400h exposing the negative pole 111 and the positive pole 121 arranged on the upper surface of each of the battery cells 100 and include tabs located at the holes 300h and 400h. The tabs of the first and second conductive plates 300 and 400 may contact the negative pole 111 or the positive pole 121 of the battery cells 100. The battery cells 100 may be connected in series and/or in parallel through the connection between the tabs and the battery cells 100. Electrical connection between the first and second conductive plates 300 and 400 and the battery cells 100 is described below with reference to FIG. 3.

The insulating layer 500 is arranged between the first and second conductive plates 300 and 400. The insulating layer 500 includes a hole 500h exposing the negative pole 111 and the positive pole 121 arranged on the upper surface of each of the battery cells 100 such that each of the tabs of the second conductive plates 400 is connected to the negative pole 111 and the positive pole 121 of the battery cell 100.

To prevent the first and second conductive plates 300 and 400 from directly contacting each other, the insulating layer 500 entirely overlaps at least the second conductive plates 400. For example, an outer end of the insulating layer 500 may extend further than an outer end of the second conductive plates 400; and an inner end of the insulating layer 500 that is adjacent to the hole 500h of the insulating layer 500 may extend further than an inner end of the second conductive plates 400 (e.g. the inner end that is adjacent to the hole 400h of the second conductive plate 400). Therefore, a size of the hole 500h of the insulating layer 500 is less than a size of the hole 400h of the second conductive plate 400.

The protective circuit module 620 is arranged over the first and second conductive plates 300 and 400 with an insulating sheet 610 therebetween. The protective circuit module 620 may be arranged over a portion of a region of the first and second conductive plates 300 and 400 to overlap the first and second conductive plates 300 and 400. The protective circuit module 620 may be electrically connected to the battery cells 100 to control charging/discharging of the battery cells 100 and may prevent overheat and explosion generated due to overcharging, overdischarging, or an over current.

The protective circuit module 620 may be directly connected to the first and second conductive plates 300 and 400. The protective circuit module 620 may include a connector 621 directly connected to the first and second conductive plates 300 and 400. In an embodiment, the connector 621 may be provided as many as the number of first and second conductive plates 300 and 400 and directly connected to each of the first and second conductive plates 300 and 400.

A protective insulator 800 may be further arranged on the protective circuit module 620, may cover all of the protective circuit module 620 and the first and second conductive plates 300 and 400, and protect the battery pack 1 from an external conductor, foreign substance, etc.

The cooling member 700 may be arranged below the battery cells 100. In an embodiment, the cooling member 700 may include a thermal conductive plate 710. In an embodiment, the terminal conductive plate may include an anodized aluminum plate.

Figure 3:
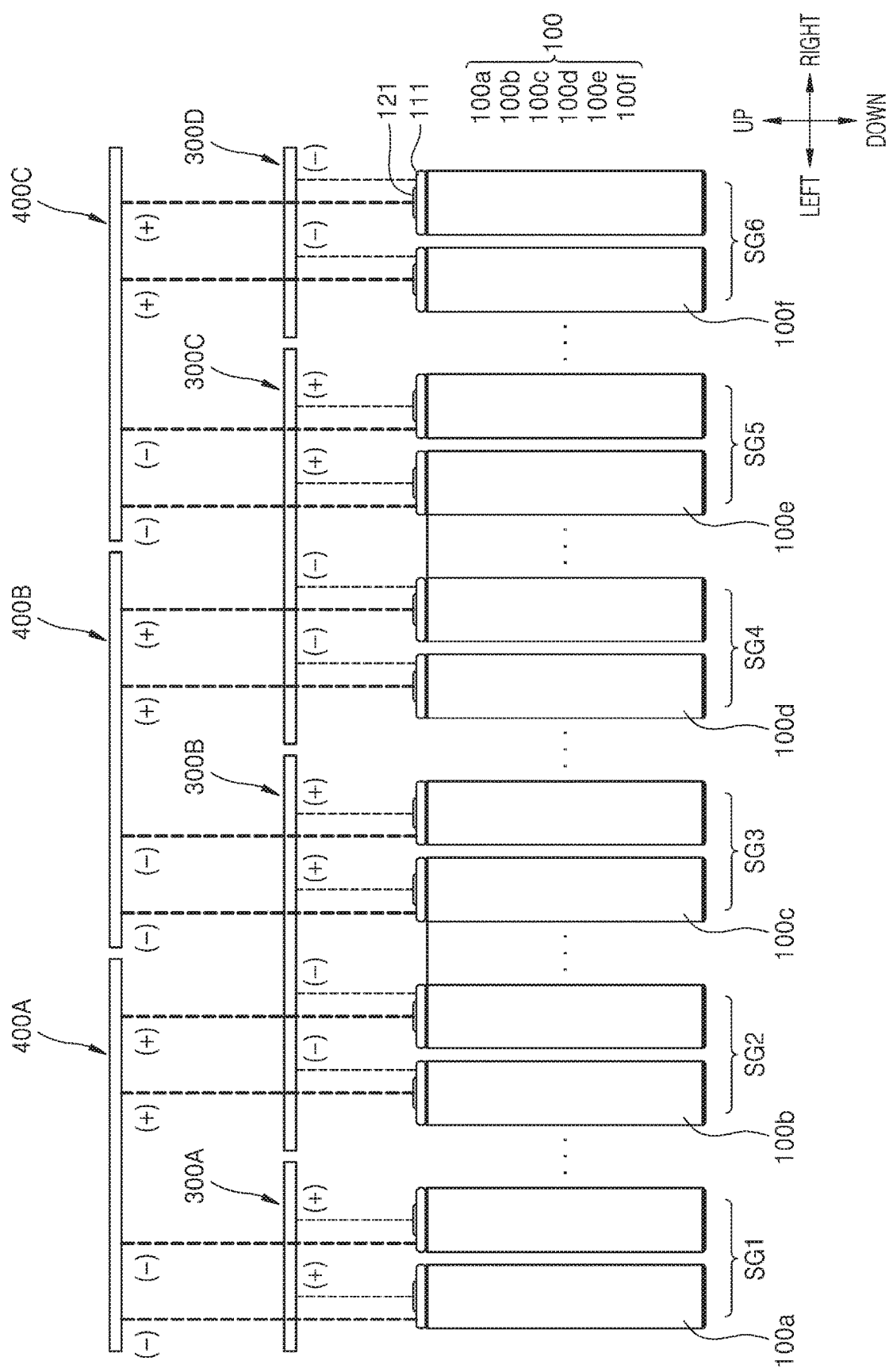
FIG. 3 is a view of electric connection between battery cells and first and second conductive plates.

FIG. 3 is a view of electric connection between battery cells and first and second conductive plates. In FIG. 3, a dashed line represents electric connection. For convenience of description, FIG. 3 illustrates an embodiment in which four first conductive plates are provided and three second conductive plates are provided. For example, as shown in FIG. 3, the first conductive plates 300 may include a (1-1)st conductive plate 300A, a (1-2)nd conductive plate 300B, a (1-3)rd conductive plate 300C, and a (1-4)th conductive plate 300D sequentially in the left and right directions. Also, the second conductive plates 400 may include a (2-1)st conductive plate 400A, a (2-2)nd conductive plate 400B, and a (2-3)rd conductive plate 400C in the left and right directions. Hereinafter, unless indicated otherwise, the first conductive plate 300 may represent one of the (1-1)st to (1-4)th conductive plates 300A, 300B, 300C, and 300D, and the second conductive plate 400 may represent the (2-1)st to (2-3)rd conductive plates 400A, 400B, and 400C.

Referring to FIG. 3, the first and second conductive plates 300 and 400 are arranged over the battery cells 100 and offset by a predetermined distance in the left and right directions (a surface direction of the first and second conductive plates) to partially overlap each other. For example, each of the second conductive plates 400 may be offset to overlap two first conductive plates 300 that are adjacent thereto.

In an embodiment, a portion of the (2-1)st conductive plate 400A overlaps the (1-1)st conductive plate 300A, and the rest of the (2-1)st conductive plate 400A overlaps the (1-2)nd conductive plate 300B. A portion of the (2-2)nd conductive plate 400B overlaps the (1-2)nd conductive plate 300B, and the rest of the (2-2)nd conductive plate 400B overlaps the (1-3)rd conductive plate 300C. A portion of the (2-3)rd conductive plate 400C overlaps the (1-3)rd conductive plate 300C, and the rest of the (2-3)rd conductive plate 400C overlaps the (1-4)th conductive plate 300D.

Battery cells 100a of a first sub-group SG1 among the battery cells 100, for example, the battery cells 100a overlapping the (1-1)st and (2-1)st conductive plates 300A and 400A are connected to the (1-1)st and (2-1)st conductive plates 300A and 400A. For example, the negative pole 111 of the battery cells 100a may be connected to the (2-1)st conductive plate 400A, and the positive pole 121 of the battery cells 100a may be connected to the (1-1)st conductive plate 300A.

Battery cells 100b of a second sub-group SG2 among the battery cells 100, for example, the battery cells 100b overlapping the (1-2)nd and (2-1)st conductive plates 300B and 400A are connected to the (1-2)nd and (2-1)st conductive plates 300B and 400A. For example, the negative pole 111 of the battery cells 100b may be connected to the (1-2)nd conductive plate 300B, and the positive pole 121 of the battery cells 100b may be connected to the (2-1)st conductive plate 400A.

Battery cells 100c of a third sub-group SG3 among the battery cells 100, for example, the battery cells 100c overlapping the (1-2)nd and (2-2)nd conductive plates 300B and 400B are connected to the (1-2)nd and (2-2)nd conductive plates 300B and 400B. For example, the negative pole 111 of the battery cells 100c may be connected to the (2-2)nd conductive plate 400B, and the positive pole 121 of the battery cells 100c may be connected to the (1-2)nd conductive plate 300B.

Battery cells 100d of a fourth sub-group SG4 among the battery cells 100, for example, the battery cells 100d overlapping the (1-3)rd and (2-2)nd conductive plates 300C and 400B are connected to the (1-3)rd and (2-2)nd conductive plates 300C and 400B. For example, the negative pole 111 of the battery cells 100d may be connected to the (1-3)rd conductive plate 300C, and the positive pole 121 of the battery cells 100d may be connected to the (2-2)nd conductive plate 400B.

Battery cells 100e of a fifth sub-group SG5 among the battery cells 100, for example, the battery cells 100e overlapping the (1-3)rd and (2-3)rd conductive plates 300C and 400C are connected to the (1-3)rd and (2-3)rd conductive plates 300C and 400C. For example, the negative pole 111 of the battery cells 100e may be connected to the (2-3)rd conductive plate 400C, and the positive pole 121 of the battery cells 100e may be connected to the (1-3)rd conductive plate 300C.

Battery cells 100f of a sixth sub-group SG6 among the battery cells 100, for example, the battery cells 100f overlapping the (1-4)th and (2-3)rd conductive plates 300D and 400C are connected to the (1-4)th and (2-3)rd conductive plates 300D and 400C. For example, the negative pole 111 of the battery cells 100f may be connected to the (1-4)th conductive plate 300D, and the positive pole 121 of the battery cells 100f may be connected to the (2-3)rd conductive plate 400C.

The first conductive plate 300 that is arranged at the center among the first conductive plates 300, for example, each of the (1-2)nd and (1-3)rd conductive plates 300B and 300C, may electrically parallel-connect battery cells 100 of one sub-group and simultaneously electrically serial-connect battery cells 100 of sub-groups that are adjacent thereto. In contrast, the first conductive plate 300 that is arranged at an edge among the first conductive plates 300, for example, each of the (1-1)st and (1-4)th conductive plates 300A and 300D, may electrically parallel-connect battery cells 100 of one sub-group.

Similarly, the second conductive plate 400, for example, each of the (2-1)st and (2-3)rd conductive plates 400A, 400B, and 400C, may electrically parallel-connect battery cells 100 of one sub-group and simultaneously electrically serial-connect battery cells 100 of sub-groups that are adjacent thereto.

For this, the first and second conductive plates 300 and 400 may include holes and tabs arranged at the holes. A detailed structure of the first and second conductive plates 300 and 400 is described with reference to FIGS. 4 to 7.

Figure 4:
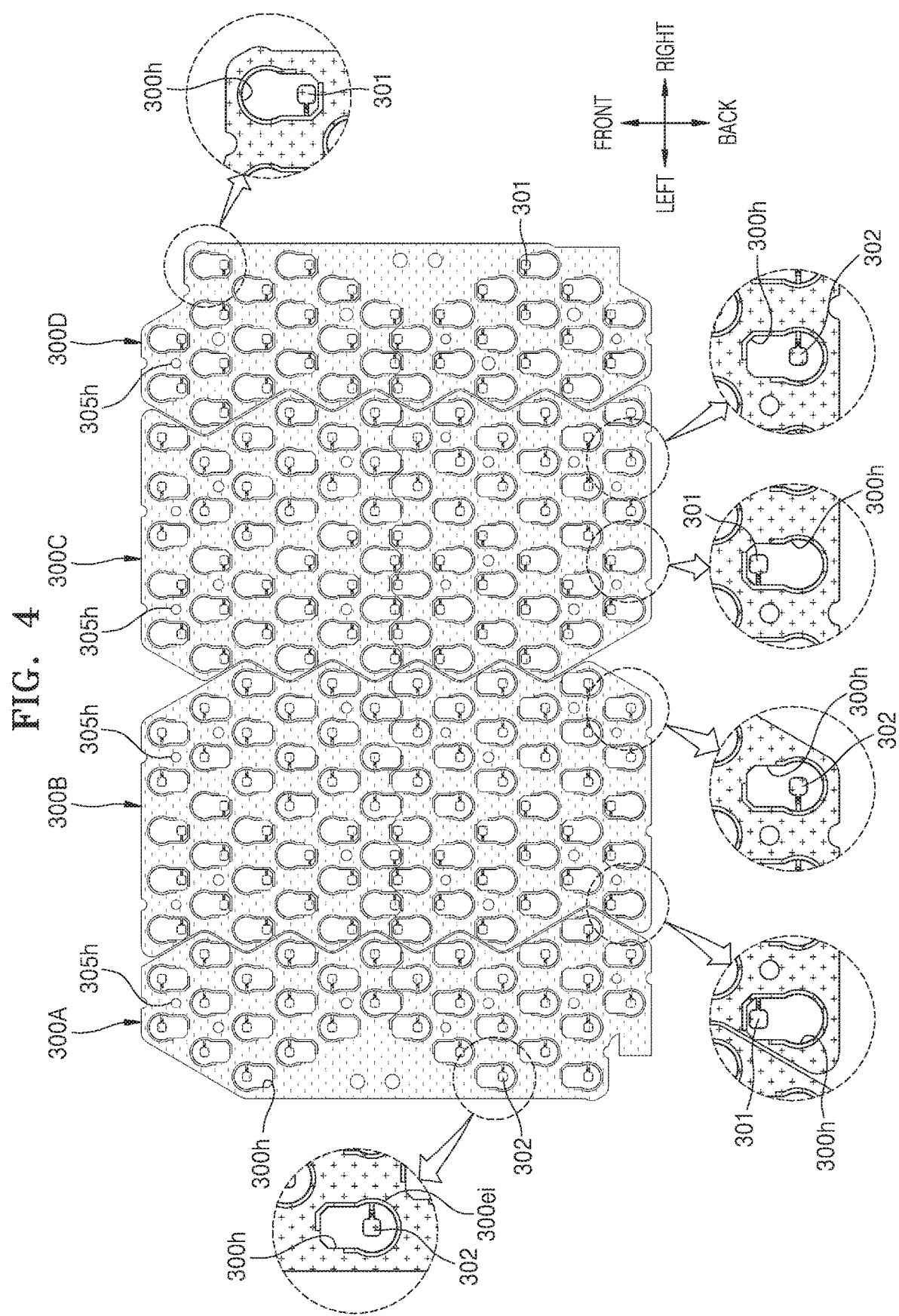
FIG. 4 is a plan view of a first conductive plate.
Figure 5:
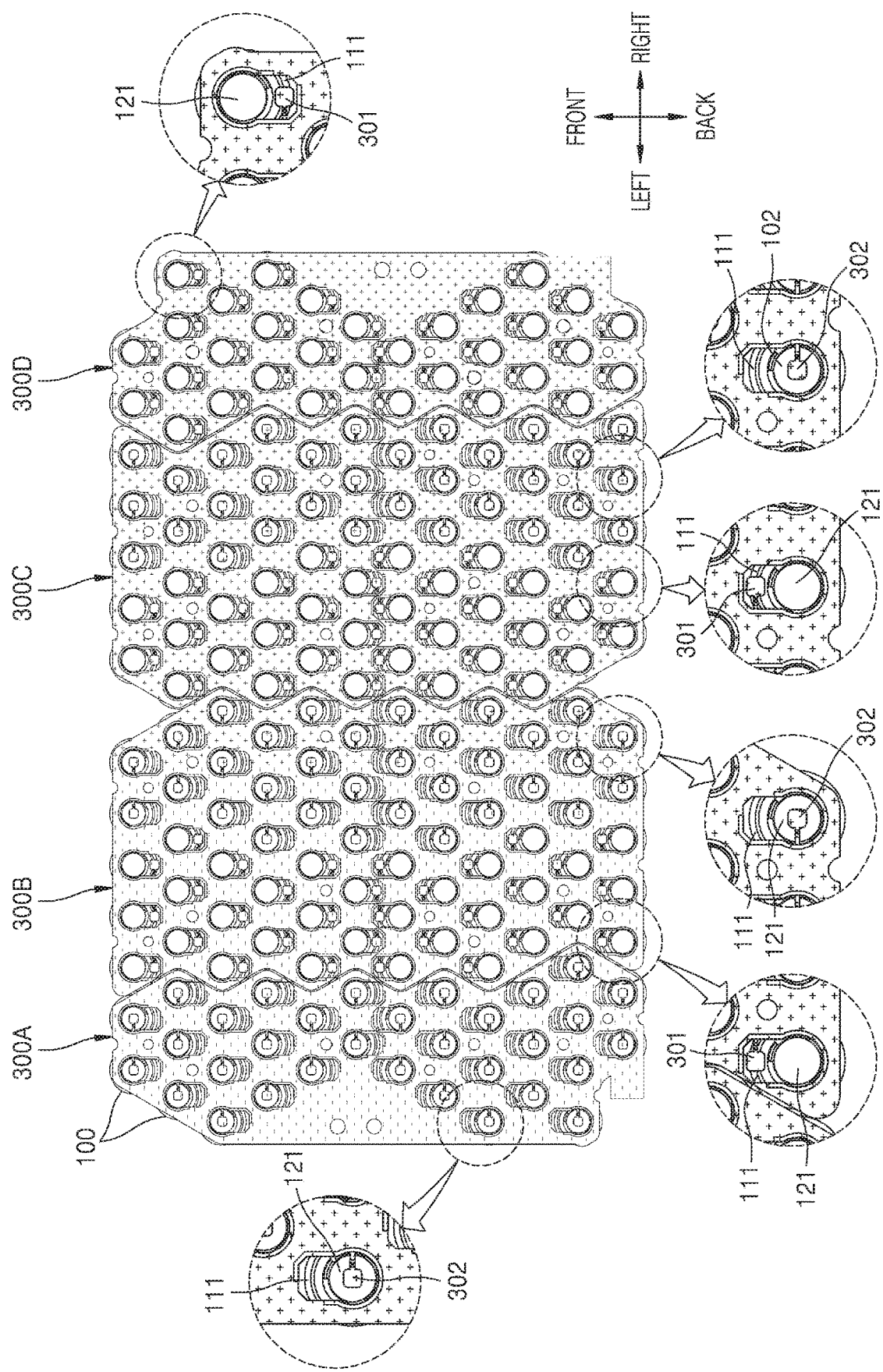
FIG. 5 is a plan view of a connection state of the first conductive plate and battery cells of FIG. 4.

FIG. 4 is a plan view of a first conductive plate, and FIG. 5 is a plan view of a connection state of the first conductive plate and battery cells of FIG. 4.

Referring to FIG. 4, the (1-1)st to (1-4)th conductive plates 300A, 300B, 300C, and 300D are adjacent to each other in the left and right directions. At least one side of the (1-1)st to (1-4)th conductive plates 300A, 300B, 300C, and 300D may have a shape fit together with each other, for example, a zigzag shape.

Each of the (1-1)st to (1-4)th conductive plates 300A, 300B, 300C, and 300D includes the holes 300h. The holes 300h are apart from each other and may expose the upper surface of the battery cell 100, for example, at least a portion of each of the negative pole 111 and the positive pole 121 as shown in FIG. 5. A tab is arranged at the hole 300h. The tab may include a negative pole tab 301 and a positive pole tab 302.

The (1-1)st conductive plate 300A includes the holes 300h. Referring to an enlarged portion of the (1-1)st conductive plate 300A in FIG. 4, the positive pole tab 302 may be arranged at each hole 300h. The positive pole tab 302 may extend toward the hole 300h from an inner end 300ei of the (1-1)st conductive plate 300A that is adjacent to the hole 300h. The (1-1)st conductive plate 300A may include only positive pole tabs 302, and as shown in FIG. 5, each positive pole tab 302 may be directly connected to the positive pole 121 of the battery cell 100 overlapping the (1-1)st conductive plate 300A. The battery cells 100 connected to the positive pole tabs 302 of the (1-1)st conductive plate 300A of FIG. 5 correspond to the battery cells 100a of the first sub-group SG1 described above with reference to FIG. 3.

The (1-2)nd conductive plate 300B includes the holes 300h. The negative pole tab 301 may be arranged at each of some of the holes 300h, and the positive pole tab 302 may be arranged at each of the rest of the holes 300h. Referring to enlarged portions of the (1-2)nd conductive plate 300B in FIG. 4, each of the negative pole tab 301 and the positive pole tab 302 may extend toward the hole 300h from an inner end of the (1-2)nd conductive plate 300B that is adjacent to the hole 300h. As shown in FIG. 5, the negative pole tabs 301 of the (1-2)nd conductive plate 300B are connected to the negative poles 111 of the battery cells 100 arranged right under the negative pole tabs 301 and overlapping the negative pole tabs 301, and the positive pole tabs 302 are connected to the positive poles 121 of the battery cells 100 arranged right under the positive pole tabs 302 and overlapping the positive pole tabs 302. In FIG. 5, the battery cells 100 connected to the negative pole tabs 301 of the (1-2)nd conductive plate 300B correspond to the battery cells 100b of the second sub-group SG2 described above with reference to FIG. 3, and the battery cells 100 connected to the positive pole tabs 302 correspond to the battery cells 100c of the third sub-group SG3 described above with reference to FIG. 3.

The (1-3)rd conductive plate 300C may have the same structure as that of the (1-2)nd conductive plate 300B. Referring to enlarged portions of the (1-3)rd conductive plate 300C, the (1-3)rd conductive plate 300C includes the holes 300h. The negative pole tab 301 may be arranged at each of some of the holes 300h, and the positive pole tab 302 may be arranged at each of the rest of the holes 300h. As shown in FIG. 5, the negative pole tabs 301 of the (1-3)rd conductive plate 300C are connected to the negative poles 111 of the battery cells 100 arranged right under the negative pole tabs 301 and overlapping the negative pole tabs 301, and the positive pole tabs 302 are connected to the positive poles 121 of the battery cells 100 arranged right under the positive pole tabs 302 and overlapping the positive pole tabs 302. In FIG. 5, the battery cells 100 connected to the negative pole tabs 301 of the (1-3)rd conductive plate 300C correspond to the battery cells 100d of the fourth sub-group SG4 described above with reference to FIG. 3, and the battery cells 100 connected to the positive pole tabs 302 correspond to the battery cells 100e of the fifth sub-group SG5 described above with reference to FIG. 3.

The (1-4)th conductive plate 300D includes the holes 300h. Referring to an enlarged portion of the (1-4)th conductive plate 300D in FIG. 4, the negative pole tab 301 may be arranged at each hole 300h. The negative pole tab 301 may extend toward the hole 300h from an inner end of the (1-4)th conductive plate 300D that is adjacent to the hole 300h. The (1-4)th conductive plate 300D may include only negative pole tabs 301, and as shown in FIG. 5, each negative pole tab 301 may be directly connected to the negative pole 111 of the battery cell 100 overlapping the (1-4)th conductive plate 300D. The battery cells 100 connected to the negative pole tabs 301 of the (1-4)th conductive plate 300D of FIG. 5 correspond to the battery cells 100f of the sixth sub-group SG6 described above with reference to FIG. 3.

Each of the (1-1)st to (1-4)th conductive plates 300A, 300B, 300C, and 300D may include an auxiliary hole 305h. The auxiliary hole 305h is a structure used for preventing the (2-1)st to (2-3)rd conductive plates 400A, 400B, and 400C from moving on the first insulating structure 210 (see FIG. 1) and is described below in a relevant section with reference to FIG. 12.

Figure 6:
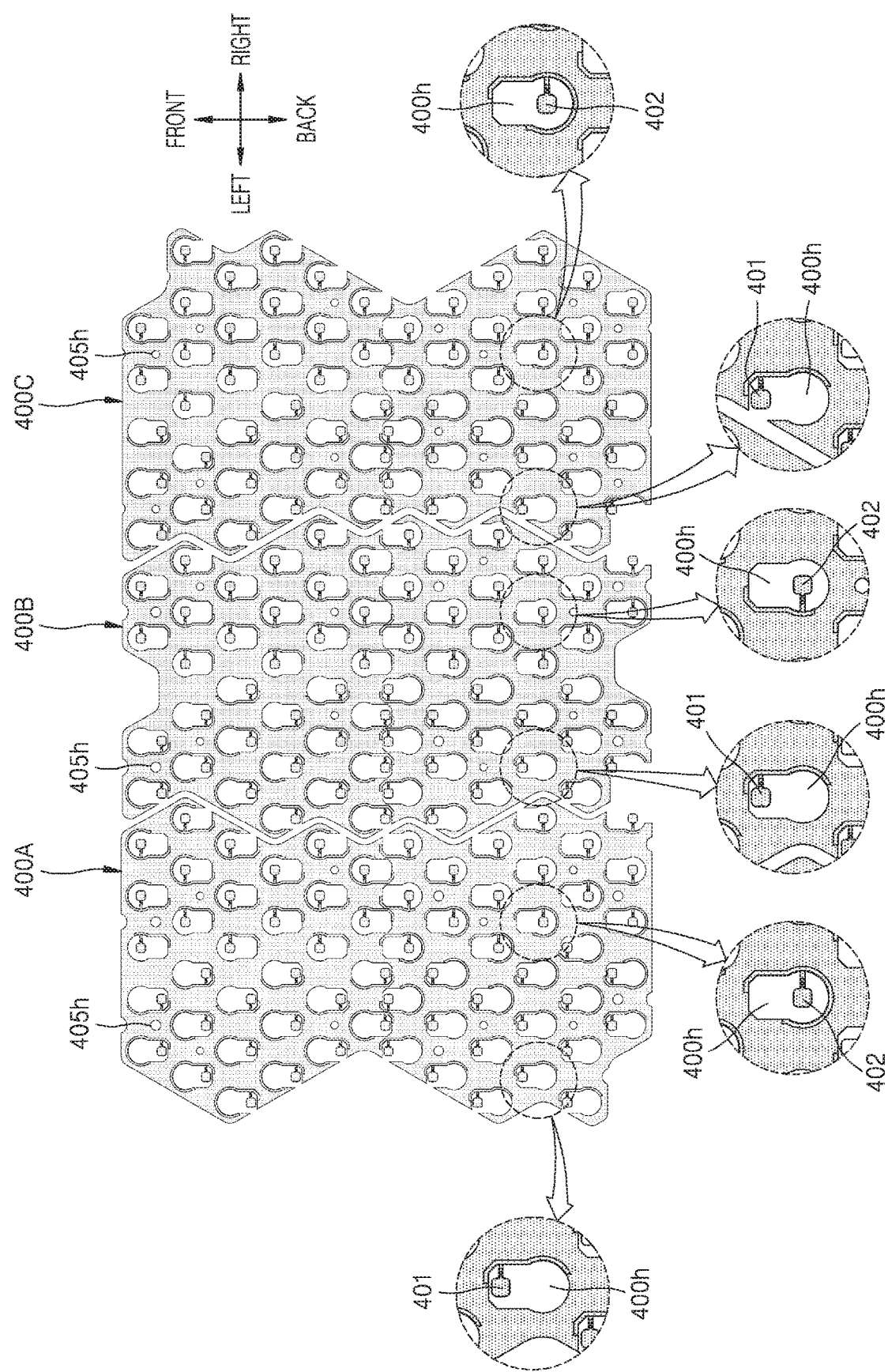
FIG. 6 is a plan view of second conductive plates.
Figure 7:
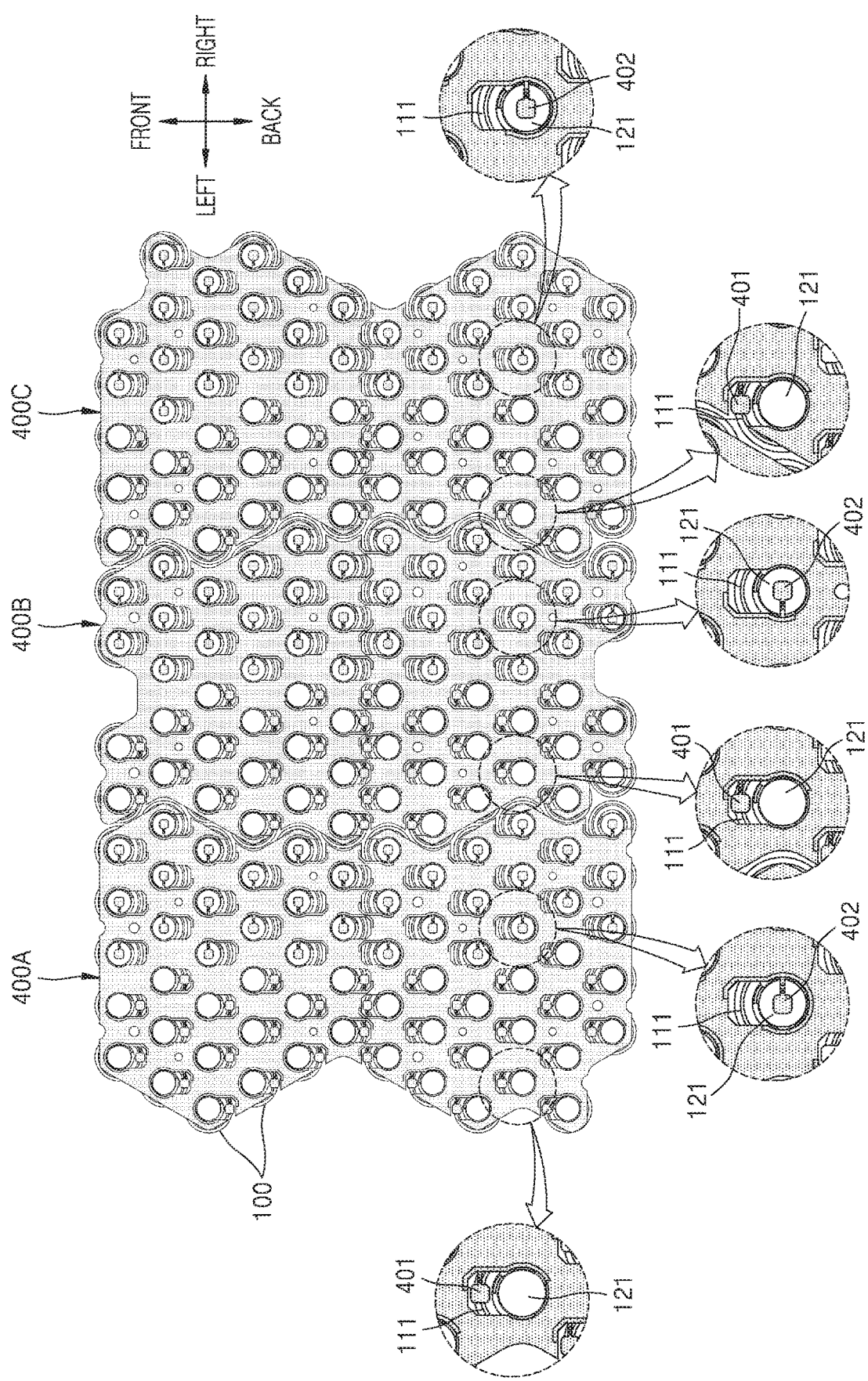
FIG. 7 is a plan view of a connection state of the second conductive plate and battery cells of FIG. 6.

FIG. 6 is a plan view of second conductive plates, and FIG. 7 is a plan view of a connection state of the second conductive plate and battery cells of FIG. 6.

Referring to FIG. 6, the (2-1)st to (2-3)rd conductive plates 400A, 400B, and 400C are adjacent to each other in the left and right directions. At least one side of the (2-1)st to (2-3)rd conductive plates 400A, 400B, and 400C may have a shape fit together with each other, for example, a zigzag shape.

Each of the (2-1)st to (2-3)rd conductive plates 400A, 400B, and 400C includes holes 400h. The holes 400h are apart from each other and overlap the holes 300h of the (1-1)st to (1-4)th conductive plates 300A, 300B, 300C, and 300D described above with reference to FIG. 4.

Each hole 400h of the (2-1)st to (2-3)rd conductive plates 400A, 400B, and 400C may expose at least a portion of the upper surface of the battery cell 100, for example, each of the negative pole 111 and the positive pole 121 as shown in FIG. 7. A tab is arranged at each hole 400h. The tab may include a positive pole tab 402 and a negative pole tab 401.

Some of the holes 400h of the (2-1)st conductive plate 400A overlap the holes 300h of the (1-1)st conductive plate 300A described above with reference to FIG. 4, and the rest of the holes 400h overlap the holes 300h of the (1-2)nd conductive plate 300B.

The negative pole tab 401 may be arranged at some of the holes 300h of the (2-1)st conductive plate 400A, and the positive pole tab 402 may be arranged at the rest of the holes 300h. Referring to enlarged portions of the (2-1)st conductive plate 400A in FIG. 6, each of the negative pole tab 401 and the positive pole tab 402 may extend toward the hole 400h from an inner end of the (2-1)st conductive plate 400A that is adjacent to the hole 400h.

As shown in FIG. 7, the negative pole tabs 401 of the (2-1)st conductive plate 400A are connected to the negative poles 111 of the battery cells 100 arranged right under the negative pole tabs 401 and overlapping the negative pole tabs 401, and the positive pole tabs 402 are connected to the positive poles 121 of the battery cells 100 arranged right under the positive pole tabs 402 and overlapping the positive pole tabs 402. In FIG. 7, the battery cells 100 connected to the negative pole tabs 401 of the (2-1)st conductive plate 400A correspond to the battery cells 100a of the first sub-group SG1 described above with reference to FIG. 3, and the battery cells 100 connected to the positive pole tabs 402 correspond to the battery cells 100b of the second sub-group SG2 described above with reference to FIG. 3.

The (2-2)nd and (2-3)rd conductive plates 400B and 400C may have the same structure as that of the (2-1)st conductive plate 400A.

Some of the holes 400h of the (2-2)nd conductive plate 400B overlap the holes 300h of the (1-2)nd conductive plate 300B described above with reference to FIG. 4, and the rest of the holes 400h overlap the holes 300h of the (1-3)rd conductive plate 300C. Also, the negative pole tab 401 is arranged at some of the holes 300h, and the positive pole tab 402 is arranged at the rest of the holes 300h.

As shown in FIG. 7, the negative pole tabs 401 of the (2-2)nd conductive plate 400B are connected to the negative poles 111 of the battery cells 100 arranged right under the negative pole tabs 401 and overlapping the negative pole tabs 401, and the positive pole tabs 402 are connected to the positive poles 121 of the battery cells 100 arranged right under the positive pole tabs 402 and overlapping the positive pole tabs 402. In FIG. 7, the battery cells 100 connected to the negative pole tabs 401 of the (2-2)nd conductive plate 400B correspond to the battery cells 100c of the third sub-group SG3 described above with reference to FIG. 3, and the battery cells 100 connected to the positive pole tabs 402 correspond to the battery cells 100d of the fourth sub-group SG4 described above with reference to FIG. 3.

Some of the holes 400h of the (2-3)rd conductive plate 400C overlap the holes 300h of the (1-3)rd conductive plate 300C described above with reference to FIG. 4, and the rest of the holes 400h overlap the holes 300h of the (1-4)th conductive plate 300D. Also, the negative pole tab 401 is arranged at some of the holes 300h, and the positive pole tab 402 is arranged at the rest of the holes 300h.

As shown in FIG. 7, the negative pole tabs 401 of the (2-3)rd conductive plate 400C are connected to the negative poles 111 of the battery cells 100 arranged right under the negative pole tabs 401 and overlapping the negative pole tabs 401, and the positive pole tabs 402 are connected to the positive poles 121 of the battery cells 100 arranged right under the positive pole tabs 402 and overlapping the positive pole tabs 402. In FIG. 7, the battery cells 100 connected to the negative pole tabs 401 of the (2-3)rd conductive plate 400C correspond to the battery cells 100e of the fifth sub-group SG5 described above with reference to FIG. 3, and the battery cells 100 connected to the positive pole tabs 402 correspond to the battery cells 100f of the sixth sub-group SG6 described above with reference to FIG. 3.

Each of the (2-1)st to (2-3)rd conductive plates 400A, 400B, and 400C may include an auxiliary hole 405h. The auxiliary hole 405h is a structure for preventing the (2-1)st to (2-3)rd conductive plates 400A, 400B, and 400C from moving on the first insulating structure 210 (see FIG. 1) and is described below in a relevant section with reference to FIG. 12.

Figure 8:
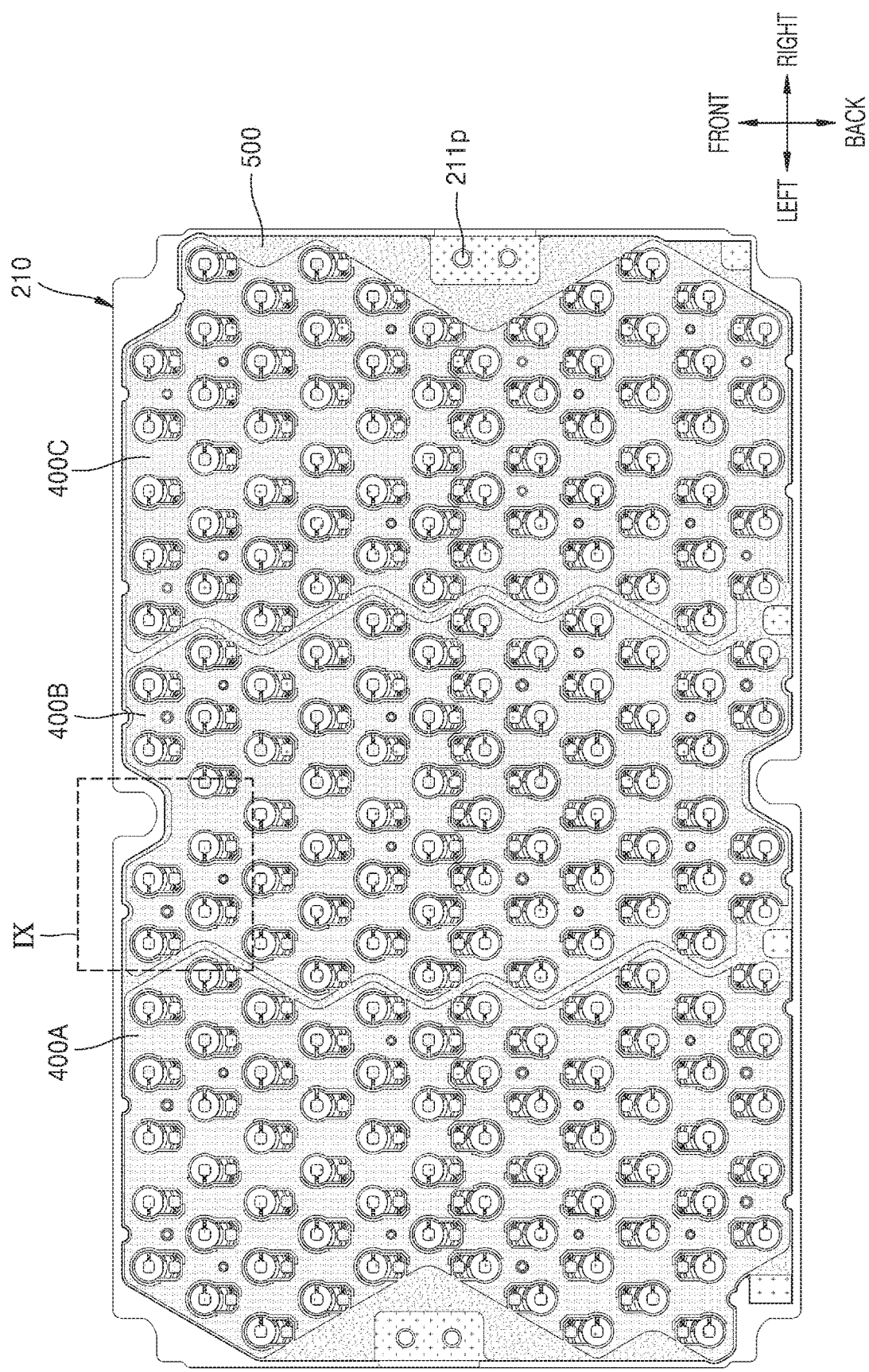
FIG. 8 is a plan view of a state in which battery cells, a first insulating structure, first and second conductive plates, and an insulating layer of FIG. 1 are assembled.
Figure 9:
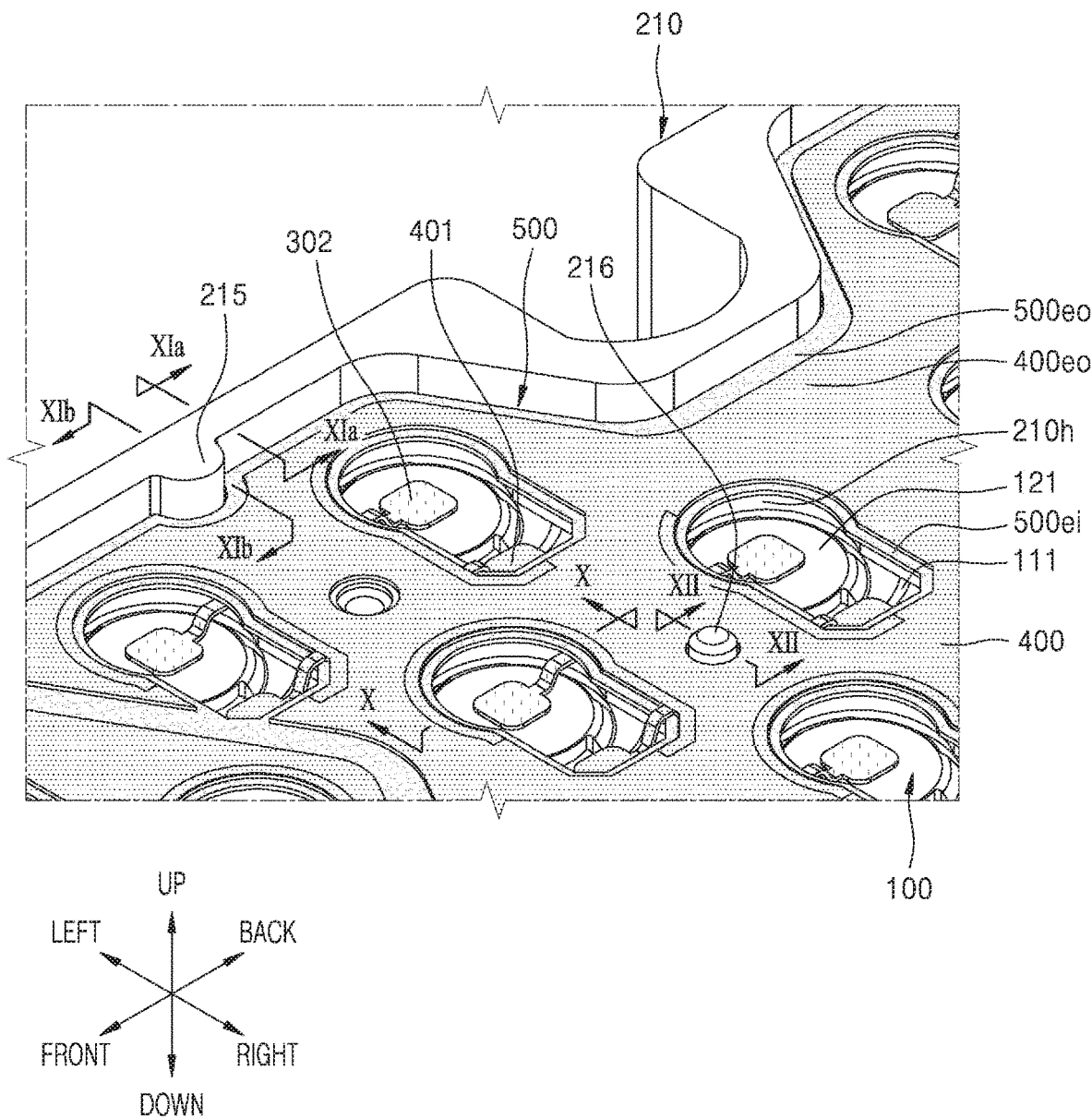
FIG. 9 is a perspective view of a region IX of FIG. 8.
Figure 10:
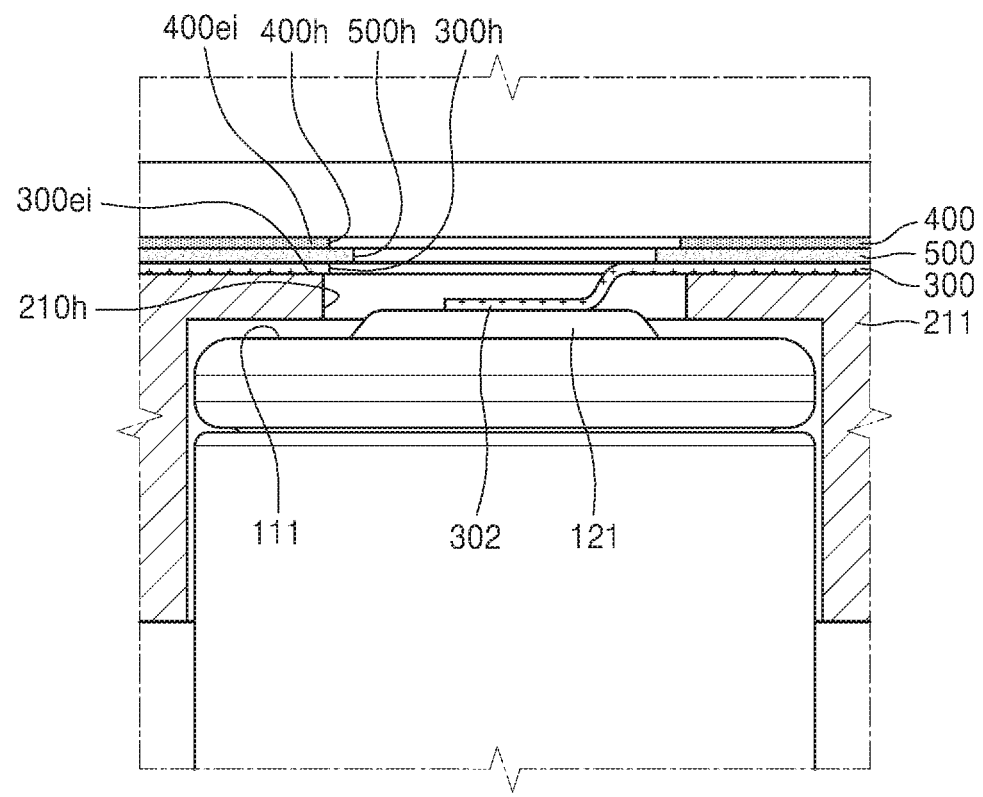
FIG. 10 is a cross-sectional view taken along line X-X of FIG. 9.
Figure 11A:
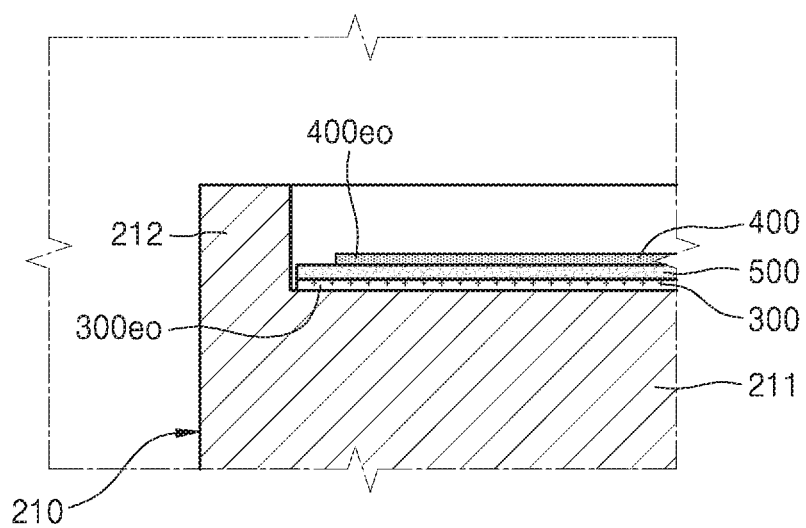
FIGS. 11A and 11B are cross-sectional views taken along lines XIa-XIa and XIb-XIb of FIG. 9.
Figure 11B:
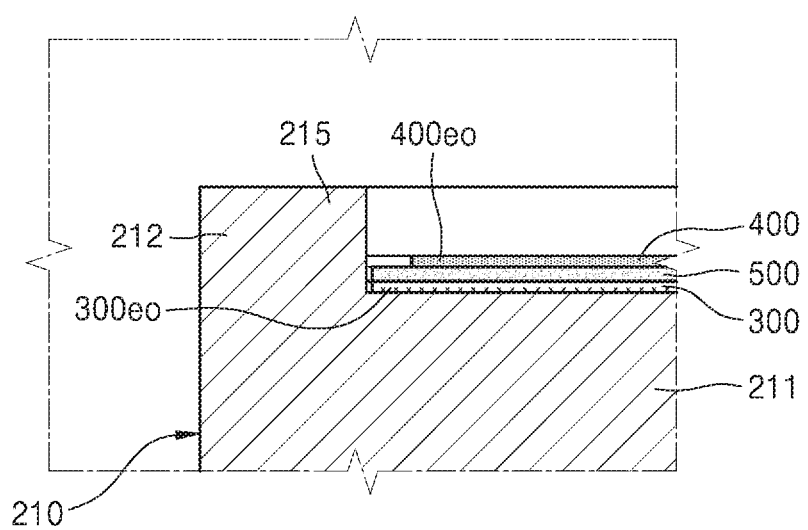
Figure 12:
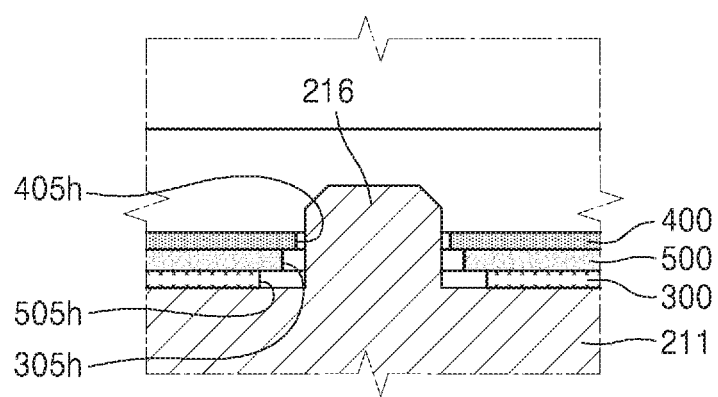
FIG. 12 is a cross-sectional view taken along line XII-XII of FIG. 9.

FIG. 8 is a plan view of a state in which battery cells, a first insulating structure, first and second conductive plates, and an insulating layer of FIG. 1 are assembled, FIG. 9 is a perspective view of a region IX of FIG. 8, FIG. 10 is a cross-sectional view taken along line X-X of FIG. 9, FIGS. 11A and 11B are cross-sectional views taken along lines XIa-XIa and XIb-XIb of FIG. 9, and FIG. 12 is a cross-sectional view taken along line XII-XII of FIG. 9.

Referring to FIGS. 8 to 10, the battery cells 100 are arranged under the first insulating structure 210, and the first and second conductive plates 300 and 400 are arranged on the first insulating structure 210, the insulating layer 500 being arranged between the first and second conductive plates 300 and 400.

Since the holes 300h and 400h respectively of the first and second conductive plates 300 and 400, the holes 500h of the insulating layer 500, and the holes 210h of the first insulating structure 210 overlap each other, the negative pole 111 and the positive pole 121 of the battery cell 100 may be exposed. For example, as shown in FIG. 9, the negative pole 111 of the battery cell 100 may be connected to the negative pole tab 401 of the second conductive plate 400, and the positive pole 121 may be connected to the positive pole tab 302 of the first conductive plate 300.

As shown in FIGS. 9 and 10, an inner end 500ei of the insulating layer 500 that is adjacent to the hole 500h of the insulating layer 500 may extend toward a center of the hole 500h beyond at least an inner end 400ei of the second conductive plate 400 of the first and second conductive plates 300 and 400. In an embodiment, the inner end 500ei of the insulating layer 500 may extend beyond inner ends 300ei and 400ei respectively of the first and second conductive plates 300 and 400, and thus the inner ends 300ei and 400ei of the first and second conductive plates 300 and 400 may not contact each other. As shown in FIG. 9, an outer end 500eo of the insulating layer 500 may extend beyond an outer end 400eo of the second conductive plate 400, and thus outer ends 300eo (see FIG. 11A) and 400eo respectively of the first and second conductive plates 300 and 400 may not contact each other.

The first insulating structure 210 may include a first protrusion 215 arranged at an edge thereof, and a second protrusion 216 arranged at an inside thereof. The first protrusion 215 is a structure for relatively fixing the first conductive plates 300 onto the first insulating structure 210, and the second protrusion 216 is a structure for relatively fixing the second conductive plates 400 onto the first insulating structure 210.

The first protrusion 215 may protrude in a surface direction of the first and second conductive plates 300 and 400, for example, in back and forth directions in FIG. 9. The second protrusion 216 may protrude from the upper insulating plate 211 of the first insulating structure 210 in a thickness direction of the first and second conductive plates 300 and 400, for example, in an up direction in FIG. 9.

First, the first protrusion 215 is mainly described.

Referring to FIGS. 11A and 11B, the first insulating structure 210 includes an edge portion 212 corresponding to an edge of the upper insulating plate 211 and protruding upward, and the first protrusion 215 protruding from one side of the edge portion 212 in the surface direction of the first conductive plate 300. An outer end 300oe of the first conductive plate 300 may be adjacent to the edge portion 212 and the first protrusion 215.

The first conductive plate 300 may be prevented from being moved on or separated from the first insulating structure 210 by the first protrusion 215. The first conductive plate 300 may be arranged inside the edge portion 212, and an outer end 200oe of the first conductive plate 300 that is adjacent to the first protrusion 215 may be arranged inside the first protrusion 215 along a shape of the first protrusion 215. A location of the first conductive plate 300 may be regulated in an inner space surrounded by the edge portion 212 by the first protrusion 215.

An outer end 400oe of the second conductive plate 400 is located further inward than the outer end 300oe of the first conductive plate 300. In other words, the outer end 300eo of the first conductive plate 300 extends toward the edge portion 212 beyond the outer end 400eo of the second conductive plate 400.

The first protrusion 215 is a structure for preventing the first conductive plate 300 from being moved on or separated from the first insulating structure 210. In the case where the second conductive plate 400 is regulated by the first protrusion 215, the first and second conductive plates 300 and 400 overlapping each other may unexpectedly contact each other. However, according to embodiments, as shown in FIGS. 11A and 11B, since the outer end 400eo of the second conductive plate 400 is located further inward than the outer end 300eo of the first conductive plate 300, the second conductive plate 400 may not be regulated or less regulated by the first protrusion 215. Therefore, while the battery pack 1 is assembled, location twisting of the second conductive plate 400 by the first protrusion 215 and an issue in which the first and second conductive plates 300 and 400 contact each other may be resolved.

Next, the second protrusion 216 is mainly described.

Referring to FIG. 12, the second protrusion 216 protrudes upward from the upper insulating plate 211 and passes through the auxiliary holes 305h and 405h respectively of the first and second conductive plates 300 and 400, and an auxiliary hole 505h of the insulating layer 500. The second protrusion 216 is arranged to correspond to spaces of the holes 300h and 400h respectively of the first and second conductive plates 300 and 400.

A diameter of the second protrusion 216 may be substantially the same as an inner diameter of the auxiliary hole 405h of the upper insulating plate 211, or may have an error of about 15% or less. In contrast, the auxiliary hole 305h of the first conductive plates 300 may be greater than the auxiliary hole 405h of the second conductive plates 400.

The second protrusion 216 is a structure for preventing the second conductive plate 400 from being moved on or separated from the first insulating structure 210. In the case where the first conductive plate 300 is regulated by the second protrusion 216, the first and second conductive plates 300 and 400 overlapping each other may unexpectedly contact each other. However, according to embodiments, since the auxiliary hole 305h of the first conductive plates 300 is larger than the auxiliary hole 405h of the second conductive plates 400, the first conductive plate 400 may not be regulated or less regulated by the second protrusion 216. Therefore, while the battery pack 1 is assembled, location twisting of the first conductive plate 300 by the second protrusion 216 and an issue in which the first and second conductive plates 300 and 400 contact each other may be resolved.

Figure 13:
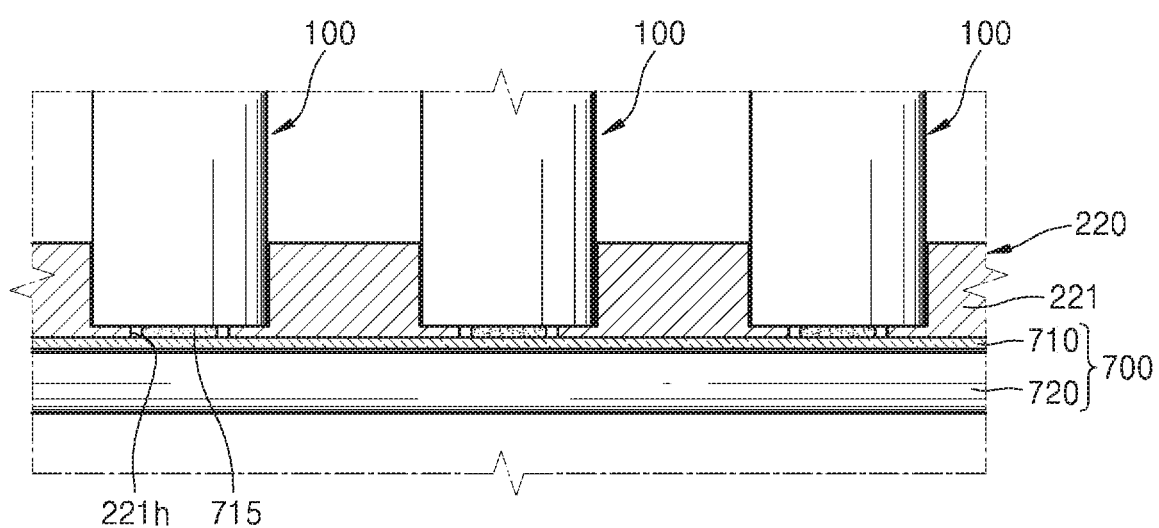
FIG. 13 is a cross-sectional view of a lower portion of a battery pack according to an embodiment.

FIG. 13 is a cross-sectional view of a lower portion of a battery pack according to an embodiment.

Referring to FIG. 13, the cooling member 700 is arranged below the battery cell 100. The cooling member 700 may include the thermal conductive plate 710 and a passage 720 through which cooling fluid passes. A backside of the battery cells 100 may be exposed through a hole 221h formed in a bottom insulating plate 221 of the second insulating structure 220.

As described above, the thermal conductive plate 710 may include a thermal conductive material such as an anodized aluminum plate and may be thermally connected to a backside of the battery cell 100 by the medium of a thermal conductive material such as a thermal conductive silicon 715.

The passage 720 may be arranged under the thermal conductive plate 710. Cooling fluid may move through the passage 720. The cooling fluid may include, for example, liquid such as water or a gas such as air.

Though the present embodiment has described the case where the cooling member 700 includes both the thermal conductive plate 710 and the passage 720 through which cooling fluid passes, the present disclosure is not limited thereto. In an embodiment, the cooling member 700 includes one of the thermal conductive plate 710 and the passage 720 through which cooling fluid passes.

Although the disclosure has been described with reference to the embodiments illustrated in the drawings, this is merely provided as an example and it will be understood by those of ordinary skill in the art that various changes in form and details and equivalents thereof may be made therein without departing from the spirit and scope of the disclosure as defined by the following claims.

The invention claimed is:

1. A battery pack comprising:
 a plurality of battery cells;
 a first conductive plate arranged over the plurality of battery cells and electrically connecting the plurality of battery cells, the first conductive plate comprising a first auxiliary hole;
 a second conductive plate arranged over the first conductive plate to overlap a portion of the first conductive plate and electrically connecting the plurality of battery cells the second conductive plate comprising a second auxiliary hole;
 an insulating layer arranged between the first conductive plate and the second conductive plate: and
 an insulating structure between the plurality of battery cells and the first conductive plate, the insulating structure comprising a second protrusion protruding through the first auxiliary hole and the second auxiliary hole,
 wherein a space between the first conductive plate and the second protrusion at the first auxiliary hole is greater than a space between the second conductive plate and the second protrusion at the second auxiliary hole,
 wherein at least one of the first conductive plate and the second conductive plate comprises:
 a positive pole tab connected to a positive pole of a first battery cell among the plurality of battery cells; and
 a negative pole tab connected to a negative pole of a second battery cell among the plurality of battery cells;
 wherein each of the first conductive plate and the second conductive plate includes:
 holes exposing a positive pole and a negative pole of each of the plurality of battery cells; and
 tabs respectively arranged at the holes,
 wherein the holes of the first conductive plate and the holes of the second conductive plate overlap each other.

2. The battery pack of claim 1, wherein the plurality of battery cells are arranged such that a positive pole and a negative pole of each of the plurality of battery cells face the same side.

3. The battery pack of claim 1, wherein the insulating layer includes holes overlapping the holes of the first conductive plate and the holes of the second conductive plate.

4. The battery pack of claim 3, wherein an inner end of the insulating layer that is adjacent to the holes of the insulating layer extends toward a center of the holes of the insulating layer beyond an inner end of the second conductive plate.

5. The battery pack of claim 1, wherein one of a positive pole and a negative pole of each of the plurality of battery cells is located at a central portion of one side of each of the plurality of battery cells, and the other is located at a peripheral portion of the one side.

6. The battery pack of claim 1, wherein
the insulating structure includes holes exposing the positive pole and the negative pole of the plurality of battery cells.

7. The battery pack of claim 6, wherein the insulating structure includes a first protrusion corresponding to an outer end of the first conductive plate.

8. The battery pack of claim 1, wherein an outer end of the first conductive plate extends further toward an outside than an outer end of the second conductive plate.

9. The battery pack of claim 1, further comprising a cooling member arranged on an opposite side of the first and second conductive plates with the plurality of battery cells therebetween.

10. The battery pack of claim 9, wherein the cooling member includes a thermal conductive plate.

11. The battery pack of claim 9, wherein the cooling member includes a passage through which cooling fluid passes.

* * * * *

UNITED STATES PATENT AND TRADEMARK OFFICE
CERTIFICATE OF CORRECTION

| | |
|---|---|
| PATENT NO. | : 11,515,598 B2 |
| APPLICATION NO. | : 16/467023 |
| DATED | : November 29, 2022 |
| INVENTOR(S) | : Sanghoon Bae et al. |

It is certified that error appears in the above-identified patent and that said Letters Patent is hereby corrected as shown below:

In the Claims

Column 14, Line 33, Claim 1        Delete "cells" and
                                   Insert -- cells, --

Column 14, Line 36, Claim 1        Delete "plate:" and
                                   Insert -- plate; --

Signed and Sealed this
Fifth Day of September, 2023

*Katherine Kelly Vidal*
Katherine Kelly Vidal
*Director of the United States Patent and Trademark Office*